(12) United States Patent
Shabtai et al.

(10) Patent No.: US 9,509,716 B2
(45) Date of Patent: Nov. 29, 2016

(54) SOCIAL NETWORK HONEYPOT

(71) Applicant: DEUTSCHE TELEKOM AG, Bonn (DE)

(72) Inventors: Asaf Shabtai, Ness Ziona (IL); Rami Puzis, Ashdod (IL); Yuval Elovici, Arugot (IL)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 14/700,551

(22) Filed: Apr. 30, 2015

(65) Prior Publication Data

US 2015/0326608 A1 Nov. 12, 2015

(30) Foreign Application Priority Data

May 8, 2014 (IL) .......................................... 232528

(51) Int. Cl.
*H04L 29/06* (2006.01)
*H04L 29/08* (2006.01)

(52) U.S. Cl.
CPC ....... *H04L 63/1491* (2013.01); *H04L 63/1425* (2013.01); *H04L 67/306* (2013.01)

(58) Field of Classification Search
CPC ............. H04L 67/306; H04L 63/1425; H04L 63/1491
See application file for complete search history.

(56) References Cited

U.S. PATENT DOCUMENTS

| | | | | |
|---|---|---|---|---|
| 7,755,937 B2 * | 7/2010 | Kitagawa | ................ | G11C 11/39 365/175 |
| 8,087,083 B1 * | 12/2011 | Norris | ................... | G06F 21/554 709/206 |
| 8,171,544 B2 * | 5/2012 | Black | ..................... | H04L 45/00 726/22 |
| 8,856,928 B1 * | 10/2014 | Rivner | ................. | G06F 21/566 713/193 |
| 9,001,699 B2 * | 4/2015 | Meghani | .............. | H04M 3/436 370/259 |
| 9,224,117 B2 * | 12/2015 | Chapman | .......... | G06Q 10/0635 |
| 9,235,730 B2 * | 1/2016 | O'Connor | .............. | G06F 21/74 |
| 9,398,038 B2 * | 7/2016 | Higbee | ............... | H04L 63/1425 |
| 2008/0201779 A1 * | 8/2008 | Tahan | ................... | G06F 21/564 726/23 |
| 2010/0031358 A1 * | 2/2010 | Elovici | .............. | H04L 12/2602 726/24 |
| 2013/0145465 A1 * | 6/2013 | Wang | .................... | G06F 21/552 726/23 |
| 2013/0305357 A1 * | 11/2013 | Ayyagari | ............... | H04L 63/14 726/22 |
| 2014/0115706 A1 * | 4/2014 | Silva | .................. | G06F 9/45533 726/23 |

FOREIGN PATENT DOCUMENTS

WO 2009055785 A2 4/2009

OTHER PUBLICATIONS

European Search Report for a counterpart foreign application—EP 15 00 1334—7 pages, mailed Oct. 8, 2015.

(Continued)

*Primary Examiner* — Yonas Bayou
(74) *Attorney, Agent, or Firm* — Roach Brown McCarthy & Gruber, P.C.; Kevin D. McCarthy

(57) ABSTRACT

The invention is a method and system for detecting attackers that are interested in attacking an organization's infrastructure during the reconnaissance phase of an Advanced Persistent Threat (APT). APTs are very sophisticated attacks and incorporate advanced methods for evading current security mechanisms. Therefore, the present invention uses an innovative social network honeypot.

8 Claims, 8 Drawing Sheets

(56) References Cited

OTHER PUBLICATIONS

Aviad Elishar, Michael Fire, Dima Kagan, Yuval Elovici, Homing Socialbots: Intrusion on a Specific Organization's Employee Using Socialbots, In proceeding of: International, Workshop on Social Network Analysis in Applications (SNAA), at Niagara Falls, Canada (2013).

Berkovich, M., Renford, M., Hansson, L., Shabtai, A., Rokach, L., Elovici, Y., "HoneyGen: an Automated Honeytokens Generator", In IEEE Social International Conference on Informatics (Social Informatics), pp. 7-12. IEEE, 2012.

Elishar, Aviad, Michael Fire, Dima Kagan, and Yuval Elovici. "Organizational intrusion: Organization mining using socialbots." In IEEE Social International Conference on Informatics (Social Informatics), pp. 7-12. IEEE, 2012.

Roni Stern, Liron Smama, Rami Puzis, Tal Beja, Zahy Bnaya, and Ariel Feiner, "Tonic: Target Oriented Network Intelligence Collection for the Social Web", In AAAI-13, Bellevue, Washington, USA, and in BISFAI 2013 (2013).

\* cited by examiner

SOCIAL NETWORK HONEYPOT

FIELD OF THE INVENTION

The invention is from the field of information technology security. Specifically the invention is directed to protecting the servers, computers, etc. of an organization and the data they contain from Advanced Persistent Threats (APTs) that could ultimately result in a cyber-attack on these resources.

BACKGROUND OF THE INVENTION

Publications and other reference materials referred to herein are numerically referenced in the following text and respectively grouped in the appended Bibliography which immediately precedes the claims.

Advanced Persistent Threats (APTs) on an organization usually follow a methodological process for conducting an attack. This process consists of the following main steps that are shown schematically in FIG. 1: (1) Reconnaissance, (2) Initial Exploitation, (3) Gaining Access/and establishing Command & Control, (4) Privilege Escalation, (5) the actual attack (Exfiltration & Subversion) and (6) Maintain Persistence and Covering tracks.

Detecting an APT at the Reconnaissance phase is very difficult since usually the activity is performed out of the organization's premises and without direct interaction with the organizational resources. At some point, the activity reaches a specific point within the organization (the entry point to the organization) to the next phases.

It is a purpose of the present invention to provide a method of detecting APTs at the Reconnaissance phase.

Further purposes and advantages of this invention will appear as the description proceeds.

SUMMARY OF THE INVENTION

In a first aspect the invention is a method for detecting attackers that are interested in attacking an organization's infrastructure during the reconnaissance phase of an Advanced Persistent Threat (APT). The method comprises the following steps:
 a. extracting actual user profiles from social networks;
 b. generating artificial profiles for artificial users from the extracted actual user profiles;
 c. creating artificial user accounts for the artificial users;
 d. adding the artificial user accounts to social networks and to employee contact lists;
 e. creating email accounts for each of the artificial users;
 f. monitoring the activity of the artificial user accounts in the social networks;
 g. monitoring the activity of the email accounts; and
 h. reporting as suspicious all attempts of third parties to contact the artificial user accounts and the email accounts of the artificial users.

In embodiments of the method of the invention the artificial profiles are created by a human expert using data collected from social networks.

In embodiments of the method of the invention, after an artificial profile is created by a human expert, dedicated software in modules of a dedicated system manage the evolution of the artificial profile and monitor attempts of third parties to contact the owner of the artificial profile.

In embodiments of the method of the invention the dedicated software in the modules of the dedicated system is adapted to detect an attacker that performs social network organizational mining by looking for new profiles that are attempting to connect to as many common friends in a social network as possible.

In embodiments of the method of the invention the dedicated software in the modules of the dedicated system is adapted to provide detection with minimal false alarms rate.

In embodiments of the method of the invention the dedicated software in the modules of the dedicated system is adapted to allow an organization to:
 a. understand the extent to which the organization is a target of reconnaissance via social networks;
 b. understand which functions in the organization, attackers are interested in using as entry points to the organization's infrastructure;
 c. understand to what extent attackers use email addresses of employees or the social network platform as an entry point to the organization.

In embodiments of the method of the invention actual user profiles for use in creating the artificial profiles are extracted from social networks in at least one of the following ways: searching for profiles by applying an efficient crawling of the organization's own network; and using homing social bots.

In embodiments of the method of the invention the process of generating a new artificial profile is supported by a wizard that follows the following workflow: selecting address→updating basic profile information→generating working history→generating education history→reviewing and saving the new artificial profile.

In a second aspect the invention is a system for detecting attackers that are interested in attacking an organization's infrastructure during the reconnaissance phase of an Advanced Persistent Threat (APT). The system comprises:
 A. an SN Crawler module comprising at least one plugin;
 B. a Profiles Database;
 C. a Honeypot Manager, which comprises;
  a. an Artificial Profile Generator module;
  b. a Profile Manager module;
  c. a Profile Monitoring module, which comprises:
   i. a SN Profile Monitor module; and
   ii. an Email Account Monitor module; and
 D. a Management GUI module In embodiments of the system of the invention each plugin in the SN Crawler module comprises software adapted to extract actual SN profiles from a designated SN and insert the extracted actual SN profiles into the Profiles Database.

In embodiments of the system of the invention the Profiles Database contains actual profiles extracted by the plugins in the SN Crawler module.

In embodiments of the system of the invention the Artificial Profile Generator module comprises software adapted to generate artificial profile records using actual profiles in the Profiles Database module.

In embodiments of the system of the invention the Profile Manager module comprises software adapted to create and integrate a profile in a selected SN from the data in a profile record, to identify the best location in the target social network for seeding, to propose profiles for sending friendship requests, to create connections between the artificial profile and other members in the organization, and to determine which new friendship requests to accept.

In embodiments of the system of the invention the Profile Monitoring module comprises monitoring software adapted to collect the events relating to the artificial profiles and email accounts and notifies the profile manager of every event.

In embodiments of the system of the invention the Email Monitoring module comprises detectors, software, and scanning logic adapted to collect emails sent to specific honeypot mailboxes to which it has been granted access; to store the email content including timestamp, sender, recipients, subject, content, attachments and URLs in a database; and to scan and detect any attachments and URLs for possible threats.

In embodiments of the system of the invention the Management GUI module comprises software adapted to perform reoccurring scanning of previous attachments and URLs collected and stored by the Email Monitoring module.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

Figure 1:
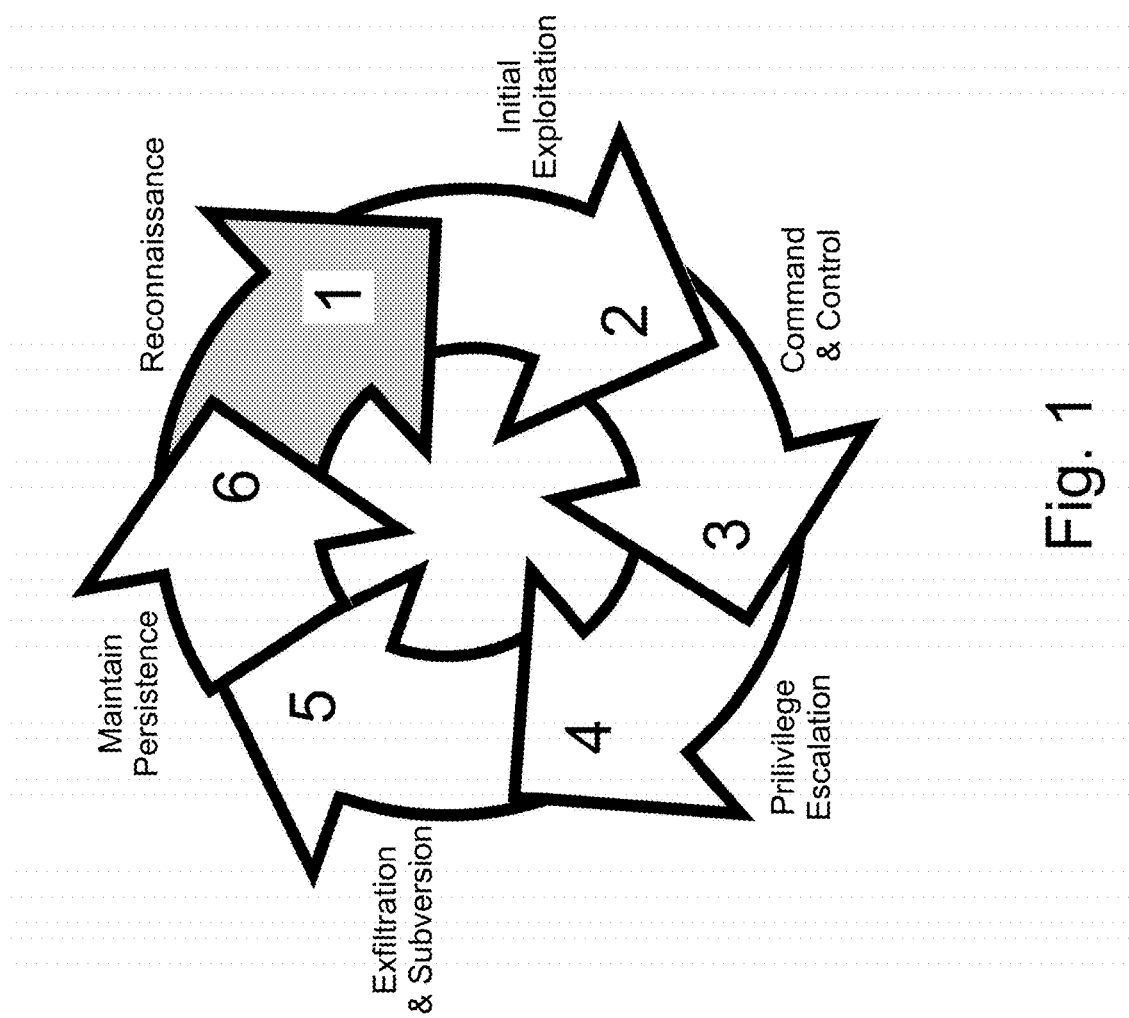
FIG. 1 schematically shows the main phases of an Advanced Persistent Threat (APT) attack.

The invention is a method and system for detecting attackers that are interested in attacking an organization's infrastructure during the reconnaissance phase of an Advanced Persistent Threat (APT). APTs are very sophisticated attacks and incorporate advanced methods for evading current security mechanisms. Therefore, the present invention uses an innovative social network honeypot.

During the reconnaissance phase attackers try to find the "appropriate" organizational entry point in order to launch an advanced attack. One way to detect such an entry point is to collect information from social and professional networks. Information extracted from social networks (SNs) may include organizational structure, position and roles within the organization (e.g., administrator, IT, sales), contact information (e.g., email), etc.

Once an attacker gains information about an insider (a honeytoken profile) the attacker will attempt to gain access to important assets by sending a malicious email to the honeypot email account. It is assumed that the attacker is a sophisticated person hence the malicious email will pass successfully through the organizational spam and phishing detection systems.

The invention is based on creating social network honeypots that will trap attempts to attack the organization through its employees. The social network honeypot framework may include:

Artificial user accounts (honeytokens) that will be added to Social Networks (SNs) and to employee contact lists. Note that the artificial account can be an account of a real collaborating employee that takes part in the monitoring activity and not necessarily a false identity.

Artificial activity for the artificial users in some/all social networks.

A system component for managing the artificial profiles.

A system component for "wiring" the artificial profiles with other profiles in the social network.

A system component for monitoring the activity of the artificial profiles.

Monitored honeypot email accounts in the organizational domain for the artificial social network profiles.

The General Concept of Social Network Honeypot

The detection of a reconnaissance activity performed by an attacker will be performed by monitoring the activity of the artificial users in social networks (SNs) and by monitoring of the artificial users email account honeypot. Any traffic not generated by the social network honeypots framework is considered suspicious.

The invention is executed by a system whose purpose is to create and manage SN honeytoken accounts. In order to allow creating reliable accounts the system will collect SN data through a dedicated SN crawler. The collected data will be utilized by a human expert for creating the artificial accounts. Once a profile is created by the human expert the system manages its evolution (posts, profile updates, connections, etc.) and monitors attempts of third parties to contact the artificial profile owner.

The system correlates access to SN artificial accounts with emails sent to the artificial users email account and inspects emails sent to the honeypot profile email account using, for example, malware detection techniques, black\white-lists, and reputation-based analysis, for detecting malicious URLs, attachments or images.

Figure 2:
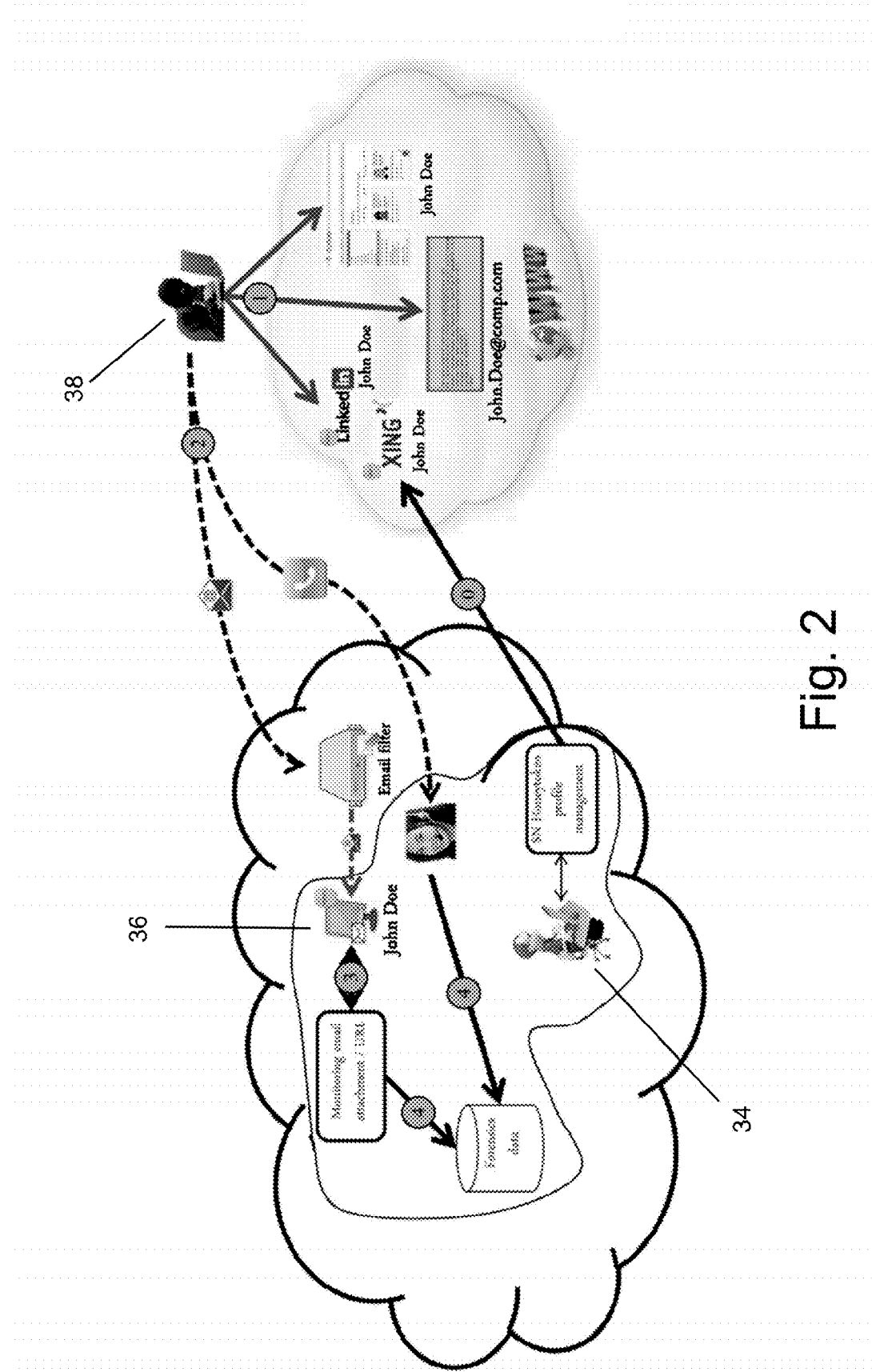
FIG. 2 schematically shows the general scenario of the process of the invention.

FIG. 2 schematically shows the general scenario of the process of the invention. The system operator 34 uses the system for adding, monitoring and managing artificial social networks profiles of "important" persons 36 attractive to attackers 38 (step 0). In step 1 an attacker 38 manages to find an "important" (artificial) profile during his/her reconnaissance activities. In step 2, the attacker 38, using the collected information, contacts the artificial profile and sends an email message with a malicious payload or, instead of an email attempts to call the artificial employee by telephone. In steps 3 and 4, the emails sent to the artificial profile email account and calls made to the artificial employee's telephone are analyzed and emails containing malicious payload are identified and the organization is alerted about the attack attempt.

Figure 3:
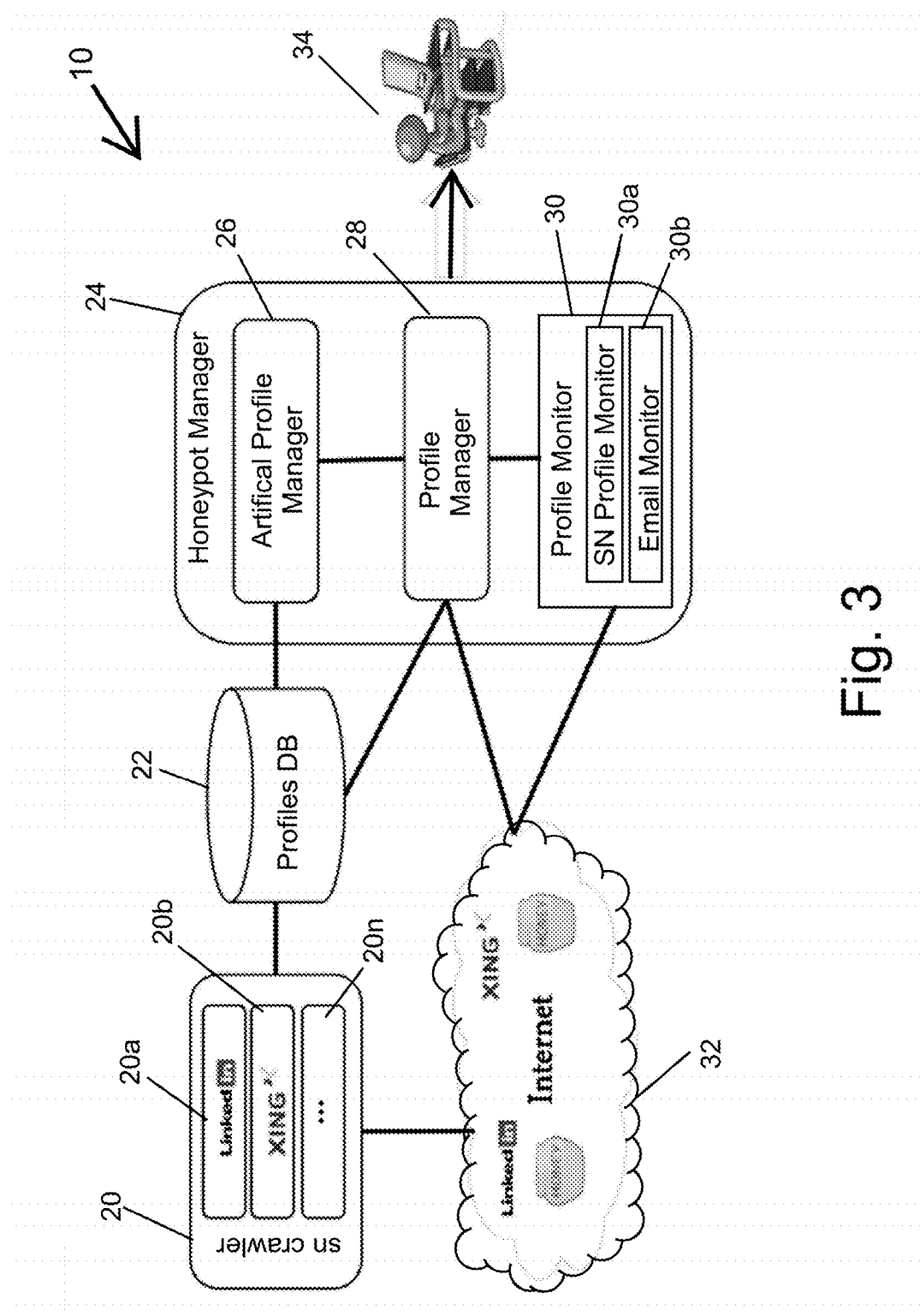
FIG. 3 schematically shows the main components of the system of the invention.

FIG. 3 schematically shows the main components of the system 10 of the invention. These components are:

An SN Crawler module 20 whose main function is to manage the extraction of SN profiles from selected SNs (in this example LinkedIn and XING) and the insertion of the extracted profile data into a generic database of profiles 22. Every selected SN will be crawled by a designated plugin 20a, 20b, . . . 20n.

A Profiles Database 22 containing actual profiles extracted from selected SNs.

A Honeypot Manager module 24, which comprises:

An Artificial Profile Generator module 26, which is a wizard for generation of artificial profile records using actual profiles in the profiles database 22. The artificial profile generator implements the main algorithm for generating artificial profiles (honeytokens). This module is used to create honeypots that will blend well into the target SN.

A Profile Manager module 28 whose main function is to create and integrate a profile in a selected SN from the data in a profile record. The profile manager identifies the best location in the target social network for seeding to ensure that the honeypot blends well in the network and proposes profiles for sending friendship requests. The profile manager creates connections between the honeypot profile and other members in the target organization. When receiving notifications from the profile monitor about new friendship requests, the profile manager will determine which requests to accept.

A Profile Monitoring module 30, which comprises a monitoring program that collects the events relating to the honeypot profile (e.g. friendship offers, acceptance to groups, profiles viewing the artificial profile, incoming messages, and comments, and notifies the profile manager of every event. Conceptually this module can be thought of as comprising two sub-modules:

(a) a SN Profile Monitor module 30*a* that monitors the artificial profiles in the social networks (e.g., when each artificial profile generated receives friend requests, comments, messages etc.); and
  (b) an Email Account Monitor module 30*b* comprised of system components that access the organization email account that was created for the artificial user and scans any attachment or URL using various inspection plugins for detecting malicious content (executables, pdf, office) or URLs.

A Management GUI module 34 that supports the entire process of creating, managing and monitoring of honeypot profiles. It enables the human system administrator to activate specific crawling tasks, viewing the crawled profiles, and the topology they create, zooming into profiles, viewing the events related to honeypots, etc.

All modules of system 10 are connected either directly or indirectly to the internet 32.

Using the system of the invention, the organization will be able to:

1. Understand the extent to which the organization is a target of reconnaissance via social networks.
2. Understand which functions in the organization, attackers are interested in (e.g., secretaries vs. senior technical personal).
3. Provide detection with minimal false alarms rate.
4. Understand to what extent attackers use email addresses of employees or the social network platform as an entry point to the organization (e.g., for injecting malicious code).
5. Use access to artificial profiles in order to detect an attacker that performs Social Network organizational mining by looking for new profiles that are attempting to connect to as many common friends as possible.

Description of the Main Components of the SN Honeypot System

The SN Crawler Module 20

The reason for crawling is to extract user profiles of the target organization (or similar organizations) from various social networks. Such information is utilized by the system for creating reliable artificial profiles. Two main methods can be used for crawling: (developer) Application Programming Interface (API) and Web Scrapping.

Mining SN profiles is a challenging task mainly because social networks attempt to detect and block crawling activity. There are many different social networks and therefore varied content and APIs. Additionally it is difficult to extract detailed information on the profiles due to user privacy settings and some data items (such as employment and education histories) require some preprocessing and data normalization because of missing and unstructured data.

Two approaches can be used for extracting actual user profiles for use in creating the artificial profiles. The first is searching for profiles by applying an efficient crawling of the organization's own network. This is done by manually obtaining crawling seeds, i.e. actual employees of the organization, and then using heuristics to focus the crawling on the organization's employees. An example of a suitable heuristic is based on the Bayesian Promising factor as presented by Stern et al. [1]. A second approach is to use homing social bots (Elishar et al., [2]). In this approach, an artificial profile is used for intelligently sending friendship requests to real profiles within a target organization in order to gain direct connection to as many profiles related to the organization as possible and thus to be exposed to more detailed information and more profiles.

The Artificial Profile Generator Module 26

This is the main component of the system and it supports both manual and automatic artificial profile generation and "wiring". Wiring profiles means connecting the artificial profile with other real and artificial profiles in the social network in order to generate a reliable profile.

The process of generating an artificial profile is supported by a wizard that follows the following workflow: selecting address→updating basic profile information→generating working history→generating education history→and finally review and save the new artificial profile. Note that although the system of the invention mainly targets professional social networks such as LinkedIn and XING, it is extendible to other social networks such as Facebook and additional information items (such as groups of interests, post etc. can be added to the system).

Each step of the wizard provides user suggestions based on statistics of existing (crawled) profiles and previously entered information from previous steps. For example, if the system operator selects a profile of a person that lives in Italy, the system will offer First Name/Last Name/City and more data items based on statistical information extracted from the crawled profiles.

In the same manner, the system supports the manual creating of employment and education histories. In the first step the user selects the current job type of the employee. Then, a timeline of work history is automatically generated, based on statistics of existing profiles, and previously entered information. The user selects companies and job types for the newly generated jobs. An educational timeline is generated, based on statistics of existing profiles, and the newly generated work history. The user selects the degrees and the educational institutes.

Figure 4:
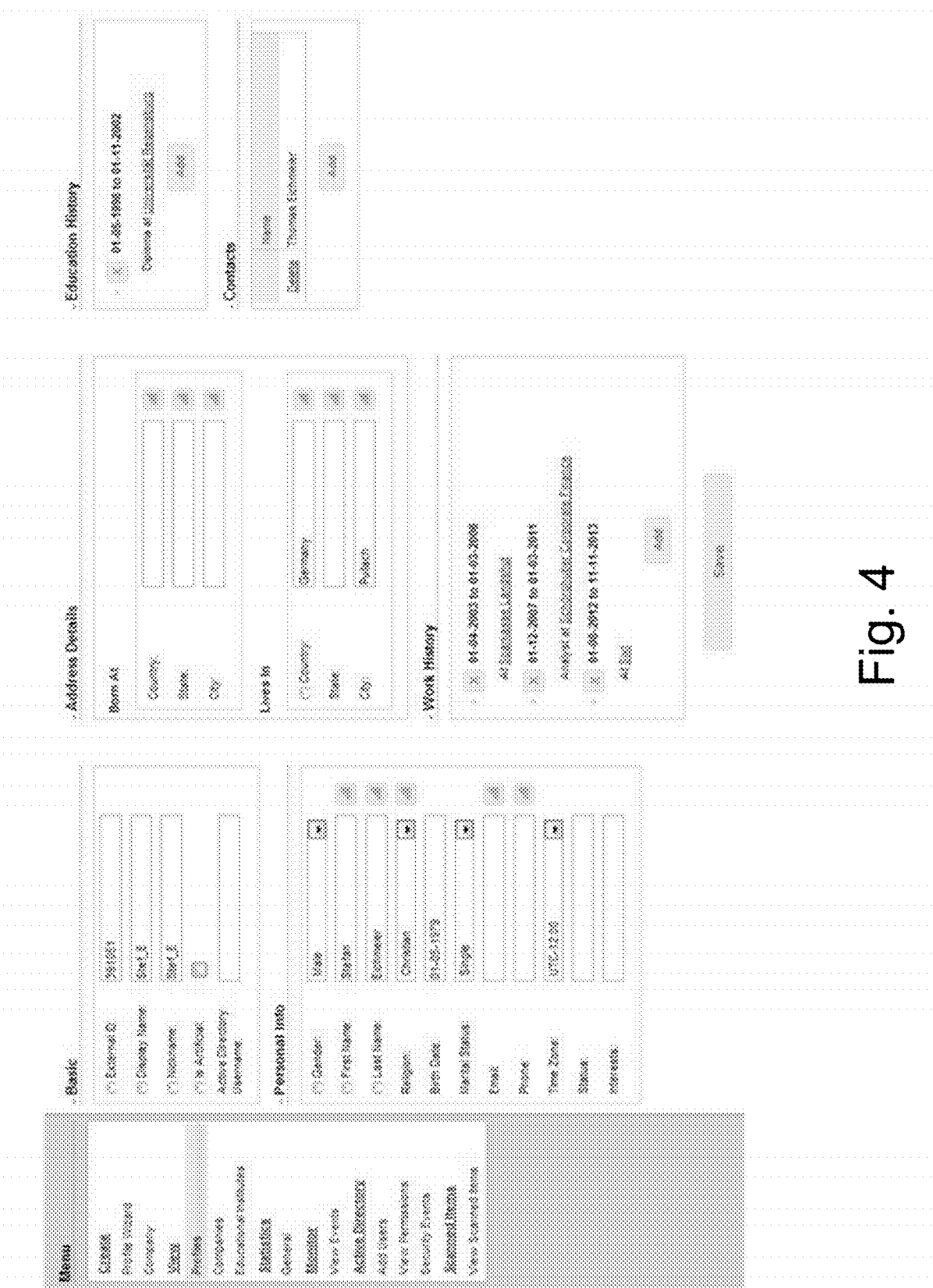
FIG. 4 is a screenshot of the artificial profile generation module.

FIG. 4 is a screenshot of the artificial profile generation module in which the system operator reviews and saves the profile that is being generated using the wizard.

The system supports the fully automatic process of generating massive numbers of artificial profiles. This is done by using HoneyGen (Berkovitch et al. [3]). HoneyGen was initially proposed for creating artificial database records based on real (genuine) records for exporting databases without compromising privacy (for example for system tests). The method implemented by this HoneyGen tool is able to generate a high-quality honeytoken which is defined as an artificial data item that is similar to real tokens such that even an expert in the relevant domain will not be able to distinguish between real tokens and the honeytoken. HoneyGen is a generic method for generating high quality honeytokens given a database.

Figure 5:
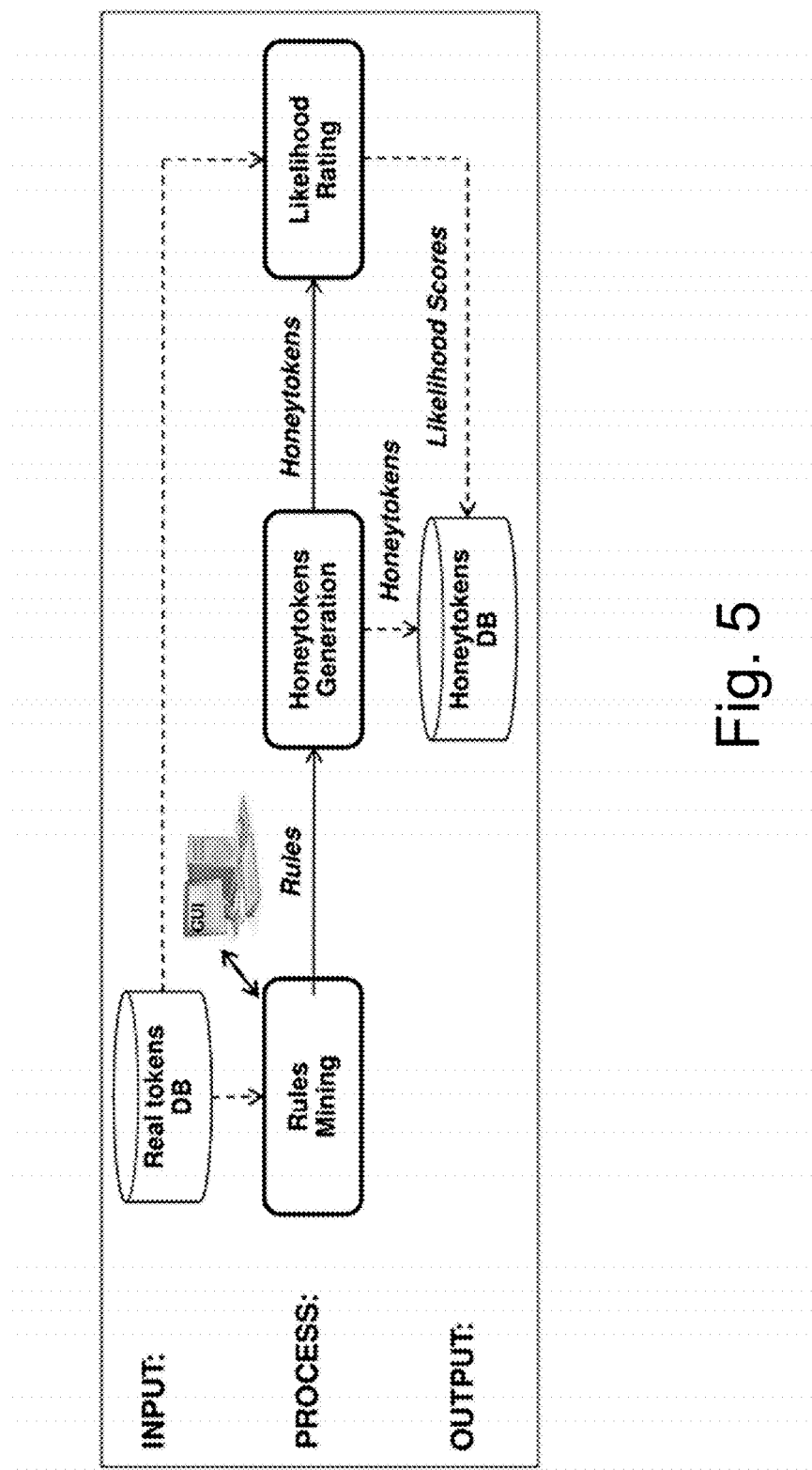
FIG. 5 schematically depicts the HoneyGen process for generating honeytokens.

The HoneyGen process is schematically depicted in FIG. 5. The input (shown in the top line) to the process includes a database of real profiles (tokens) crawled from the social network. The process is shown in the middle line of the figure. In the first step rules are mined and extracted from the database of real profiles. Examples of such rule are attribute dependencies, identity, allowed value-set, and more. Then based on the crawled data and the extracted rules a large number of artificial records is generated. This is done by transforming the data into a set of constraint satisfaction problems (CSPs). In the last step the generated artificial profiles are sorted by similarity to real tokens in the input database. A likelihood score, which indicates how real an artificial profile would appear to be to a person in the SN, is assigned to each artificial profile using a likelihood rating function that considers the commonness of its combination of values. An example of a likelihood scoring function is one that, given a set of attributes of a profile, computes the probability of another attribute (for example, given that the profile is MALE, 24 years old, what is the probability that he has a PhD?) and then combines all probabilities computed for all attributes into one aggregated score. The output of the process (shown in the bottom row) is the honeytokens and their associated likelihood scores. This process is suited for tabular data. Therefore generating employment history and education history is not supported by this tool.

The artificial profile generator module provides an automatic process for generating authentic employment and education history. This method uses a genetic search algorithm from the Artificial Intelligence domain. The process starts with extracting the employment/education history of previously crawled profiles. For the most popular job/education titles, the method then loops through the following, until a good enough history is generated:

1. Extract people with a employment/education history ending at that title
2. Create an initial collection of completely random employment/education history sequences
3. Provides a score for each sequence
4. Extracts the sequences with the highest score
5. Introducing new sequences based on the best sequences found (cross-over), and performs random changes (mutations)
6. When this process converges (i.e., the assigned score of the sequences) stop and output the sequences with the highest scores The profile manager module supports the process of wiring the artificial profile in the social network in order to create a reliable profile. An artificial profile can be wired manually with collaborating (real) employees on the organization. In addition, the system is provided with an implemented method for identifying profiles that should be approached with a friendship request. This is performed based on the "social-bot organization intrusion" strategy (Fire, 2013 [4]) which was modified by the inventors to take into account information extracted from crawled profiles such as characterization of the connections of a profile. This modified strategy is based on the following assumptions:

The more friends a user has, the more likely he will approve the friend's request
The more common friends a user has with the requester (e.g., an artificial profile) the more likely he will approve the friend's request
Each friendship request proposed by the algorithm will be approved by the system operator before sending the request.
The Profile Manager Module 28

The goal of the profile monitoring module is to monitor any activity in the social network involving the artificial profile. This module is configured with the information of the artificial profiles that needs to be monitored (e.g., target social network, profile id) and it collects events related to the artificial profile such as friendship offers, incoming messages, comments and more. The available events depend on the specific social network API.

This module allows filtering the events by: artificial accounts name, timestamp, social network, and event type. The profile monitoring module is developed as a generic framework of plugins, each of which is able to access accounts of a specific social network. Therefore the module is extendible to any social network of interest.

Figure 6:
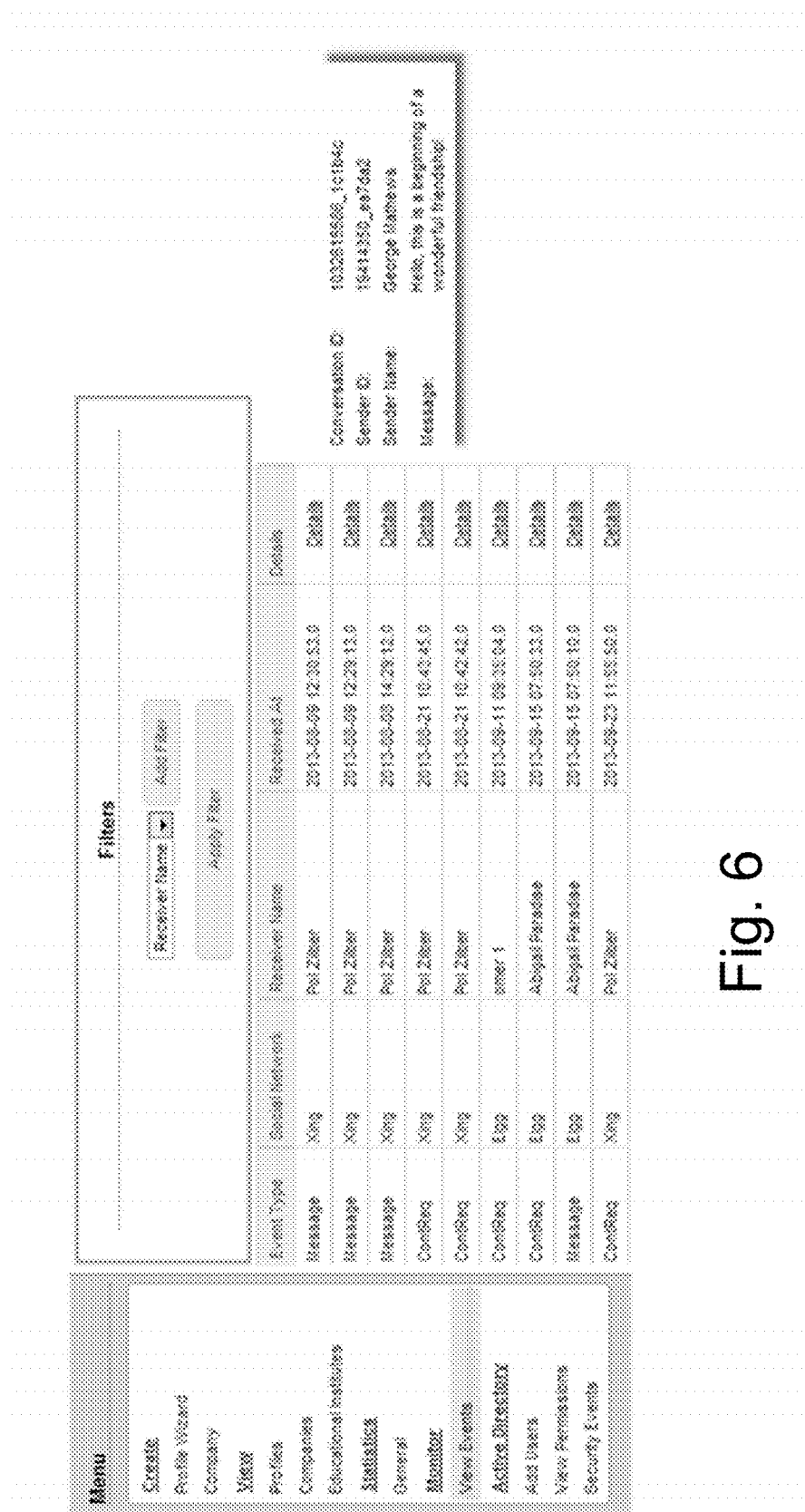
FIG. 6 is a screenshot that presents the profile monitoring module and its filtering capabilities.

This module, depending on the API provided by the specific social network, can support managing the artificial profile and taking actions on the artificial profile that will affect the profile in the network. Such actions may include (but are not limited to) accepting friendship requests, proposing friendship requests generated by an intelligent "wiring" algorithm, sending posts and messages, "like" and more. The screenshot in FIG. 6 presents the profile monitoring module and its filtering capabilities.

The Profile Monitoring module 30

As described herein above with respect to FIG. 3, this module is responsible for monitoring two things—the activities related to the artificial profile in the social networks and the activity in the email account that has been established for the artificial profile. In FIG. 3 these two functions are portrayed as handled by two sub-modules but in other embodiments two separate modules can be employed.

Figure 7:
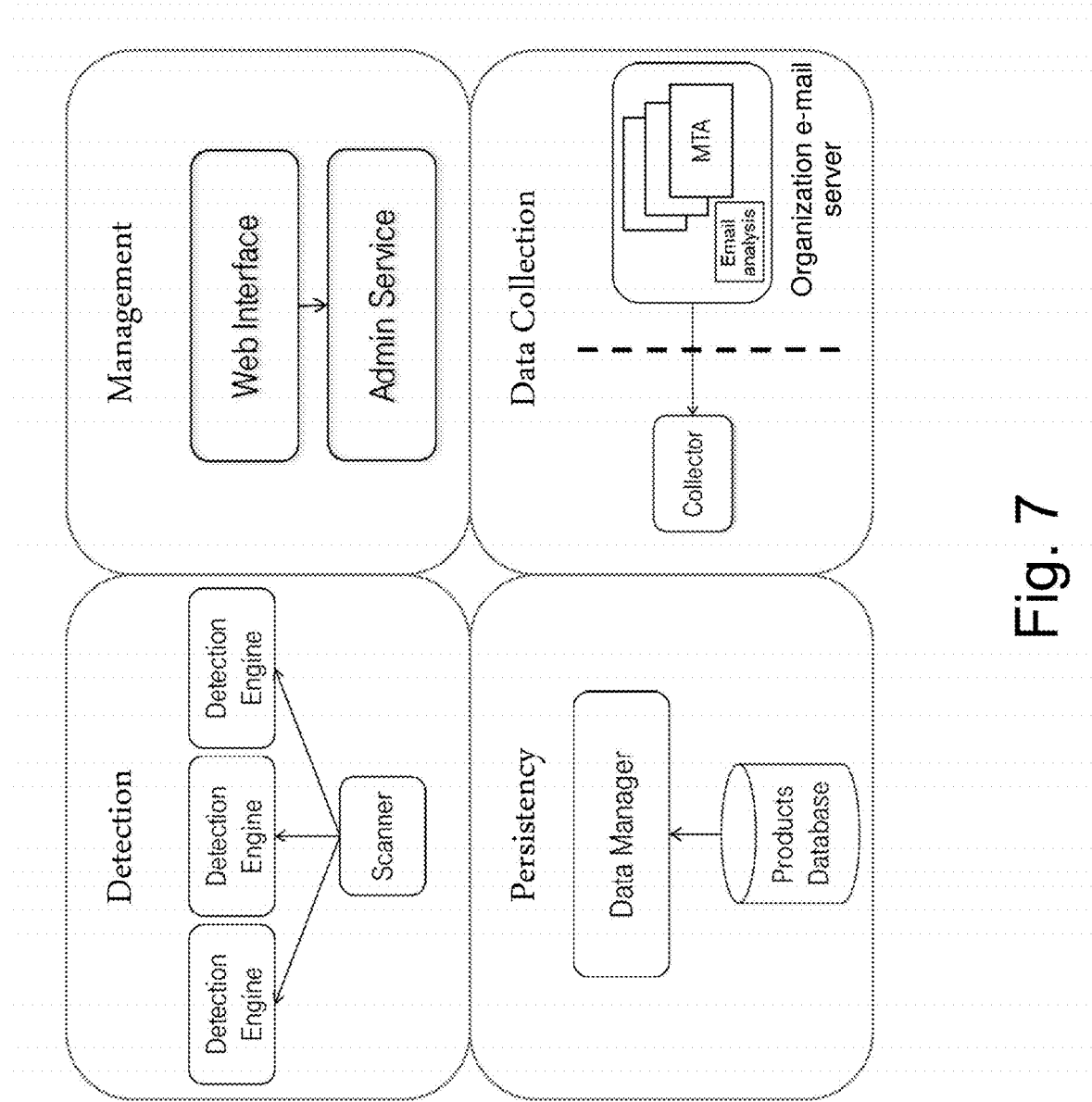
FIG. 7 schematically shows the main functions of the email monitoring module.

As said, for each artificial profile created and planted in a social network, a shadow organization or external email account is generated. The system comprises an email monitoring module whose goal is to monitor the honeypot mailboxes. FIG. 7 schematically shows the main functions of the email monitoring module. This module is granted with access (as a client application) to the specific honeypot mailboxes, it collects emails sent to these accounts (Data Collection part in FIG. 7), stores the email content including timestamp, sender, recipients, subject, content, attachments and URLs in a database (Persistency part in FIG. 7) and scans and detects any attachments and URLs for possible threats (Detection part in FIG. 7). This module is modular and supports the integration and custom development of new detectors and scanning logic. Detection results from all scanning engines are stored in the database as well.

The Management GUI Module 34

Figure 8:
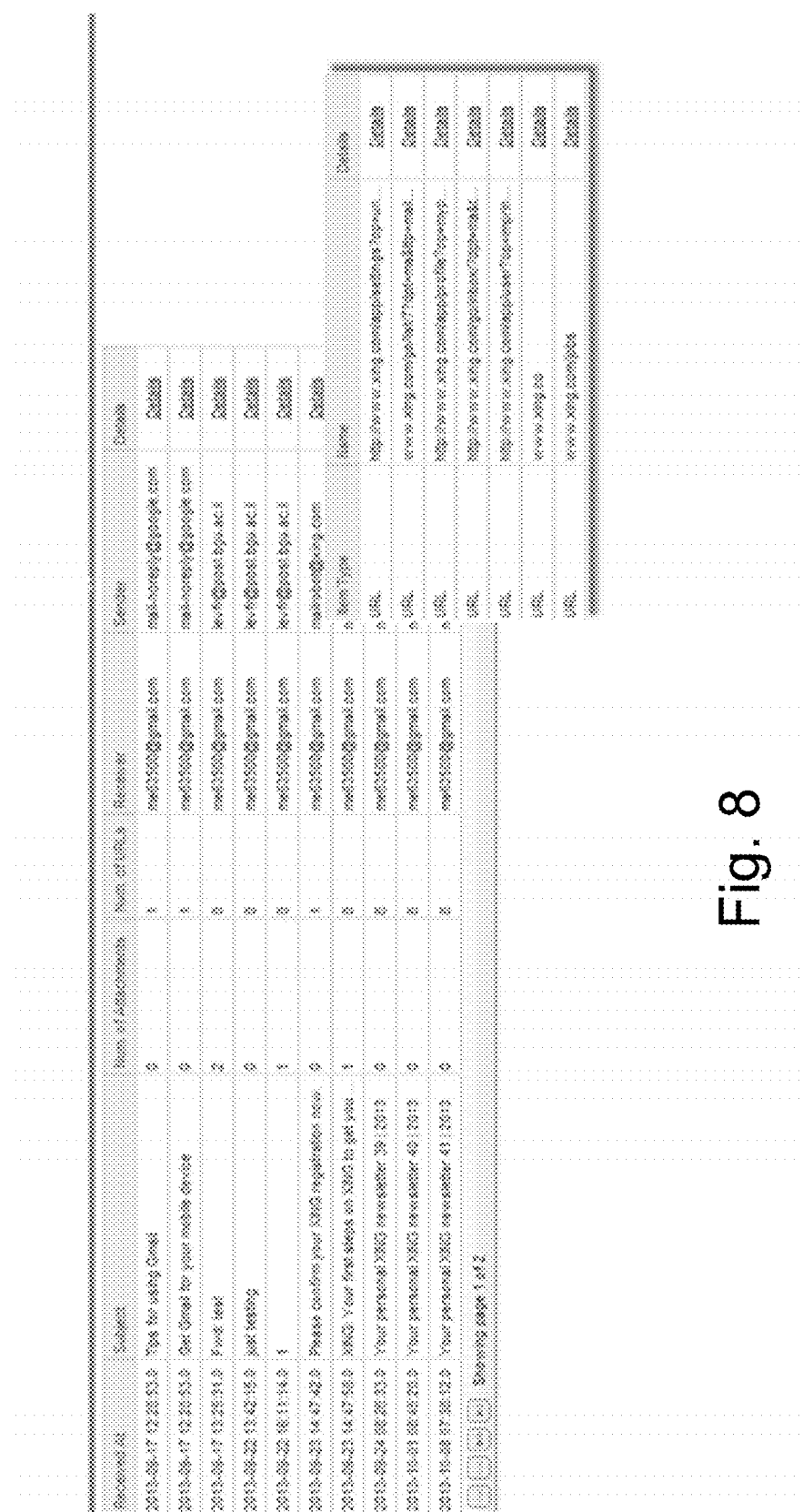
FIG. 8 is a screenshot of the Email Monitoring Module.

A management service module provides graphical user interface for exploring the emails and scanning results (as shown in the screenshot in FIG. 8). The management service also supports an important feature of this module. This feature is a reoccurring scanning of previous attachments and URLs (e.g., once every month). The reason for this important feature is as follows. It might be the case that an attachment containing a zero-day exploit was not detected by any of the detection engines at the time of sending the email. However, after some time (e.g., a few months) the exploit becomes known to detection engines. Therefore historical attachments and URLs are scanned again, the updated detection engines will identify the attachment as malicious and the organization will be able to know that there was a successful attempt to penetrate the organization.

Although embodiments of the invention have been described by way of illustration, it will be understood that the invention may be carried out with many variations, modifications, and adaptations, without exceeding the scope of the claims.

BIBLIOGRAPHY

[1] Roni Stern, Liron Smama, Rami Puzis, Tal Beja, Zahy Bnaya, and Ariel Felner, "TONIC: Target Oriented Network Intelligence Collection for the Social Web", In AAAI-13, Bellevue, Wash., USA, and in BISFAI 2013 (2013).
[2] Aviad Elishar, Michael Fire, Dima Kagan, Yuval Elovici, Homing Socialbots: Intrusion on a Specific Organization's Employee Using Socialbots, In proceeding of: International, Workshop on Social Network Analysis in Applications (SNAA), At Niagara Falls, Canada (2013).
[3] Berkovich, M., Renford, M., Hansson, L., Shabtai, A., Rokach, L., Elovici, Y., "HoneyGen: an Automated Honeytokens Generator", In Proc. of the IEEE Intelligence and Security Informatics (ISI 2011), Beijing, China, Jul. 10-12, 2011.
[4] Elishar, Aviad, Michael Fire, Dima Kagan, and Yuval Elovici. "Organizational intrusion: Organization mining using socialbots." In IEEE Social International Conference on Informatics (Social Informatics), pp. 7-12. IEEE, 2012.

The invention claimed is:

1. A method for using a system for creating, managing, and monitoring social network (SN) honeypots that will trap attempts to attack an organization's infrastructure through its employees during the reconnaissance phase of an Advanced Persistent Threat (APT), the system having:
 (a) a Profile Manager device adapted to wire the artificial profile in the SN by taking actions including identifying the best location in the target social network for seeding the artificial profile, accepting friendship requests, proposing friendship requests and sending posts and messages on behalf of the artificial profile that will affect the profile in the SN;
 (b) a Profile Monitoring device comprising monitoring software adapted to collect events relating to the artificial profiles and comprising detectors, software, and scanning logic adapted to collect emails sent to specific honeypot mailboxes to which it has been granted access; to store the email content including timestamp, sender, recipients, subject, content, attachments and URLs in a database; and to scan and detect any attachments and URLs for possible threats, and to notify a human system manager of every event relating to the artificial profiles and the honeypot mailboxes; and
 (c) a Management graphical user interface (GUI) device comprising a graphical user interface that supports the entire process of creating, managing, and monitoring the SN honeypot profiles by allowing the human system manager to carry out activities such as activating specific crawling tasks, viewing the crawled profiles and the topology they create, zooming into profiles and viewing the events related to honeypots by exploring the emails and scanning results, characterized in that:
A) the Management GUI device also comprises software adapted to perform reoccurring scanning of previous attachments and URLs collected and stored by the Profile Monitoring device; and
B) the system also has:
 d) a SN Crawler device comprising at least one plugin, wherein each plugin comprises software adapted to extract actual user SN profiles of the target organization and/or similar organizations from a designated SN and insert said extracted actual SN profiles into a generic database of profiles;
 e) a Profiles Database which comprises the actual SN profiles extracted by the at least one plugin of the SN Crawler device; and
 f) an Artificial Profile Generator device adapted to generate massive numbers of artificial profiles by using statistical methods on actual SN profiles stored in a Profiles Database and to connect the artificial profile with other real and artificial profiles in a social network;
to detect attackers that are interested in attacking an organization's infrastructure through the organization's employees during the reconnaissance phase of the APT, said method comprising:
 a. activating the Profile Manager device to:
  i) create artificial user accounts for said artificial users;
  ii) add said artificial user accounts to social networks and to employee contact lists;
  iii) create email accounts for each of said artificial users;
 b) activating the Profile Monitoring device to:
  i) monitor the activity of said artificial user accounts in the social networks;
  ii) monitor the activity of said email accounts; and
  iii) report as suspicious all attempts of third parties to contact said artificial user accounts and said email accounts of said artificial users;
 c) activating the Management GUI device to perform reoccurring scanning of previous attachments and URLs collected and stored by a Profile Monitoring device;
characterized in that the artificial user profiles are created by:
  i) activating at least one plugin of the SN Crawler device to extract actual user profiles from social networks;
  ii) storing the extracted actual user profiles in the Profiles Database; and
  iii) activating either the Artificial Profile Generator device to generate artificial profiles records by using statistical methods on the actual SN profiles stored in the Profiles Database or the Management GUI device to enable a human expert to generate the artificial profiles using data collected by the SN Crawler device from social networks.

2. The method of claim 1, wherein, after an artificial profile is created by a human expert, dedicated software in device of the system manage the evolution of said artificial profile and monitor attempts of third parties to contact the owner of said artificial profile.

3. The method of claim 2, wherein the dedicated software in the device of the system is adapted to detect an attacker that performs social network organizational mining by looking for new profiles that are attempting to connect to as many common friends in a social network as possible.

4. The method of claim 2, wherein the dedicated software in the device of the system is adapted to provide detection with minimal false alarms rate.

5. The method of claim 2, wherein the dedicated software in the device of the system is adapted to allow an organization to:
 i) understand the extent to which the organization is a target of reconnaissance via social networks;

ii) understand which functions in the organization, attackers are interested in using as entry points to the organization's infrastructure;

iii) understand to what extent attackers use email addresses of employees or the social network platform as an entry point to the organization.

6. The method of claim 1, wherein actual user profiles for use in creating the artificial profiles are extracted from social networks in at least one of the following ways: searching for profiles by applying an efficient crawling of the organization's own network; and using homing social bots.

7. The method of claim 1, wherein the process of generating a new artificial profile is supported by a wizard that follows the following workflow: selecting address→updating basic profile information→generating working history-→generating education history→reviewing and saving said new artificial profile.

8. A system for creating, managing, and monitoring social network (SN) honeypots that will trap attempts to attack an organization's infrastructure through its employees during the reconnaissance phase of an Advanced Persistent Threat (APT), the system comprising:

(a) a Profile Manager device adapted to wire the artificial profile in the SN by taking actions including identifying the best location in the target social network for seeding the artificial profile, accepting friendship requests, proposing friendship requests and sending posts and messages on behalf of the artificial profile that will affect the profile in the SN;

(b) a Profile Monitoring device comprising monitoring software adapted to collect events relating to the artificial profiles and comprising detectors, software, and scanning logic adapted to collect emails sent to specific honeypot mailboxes to which it has been granted access; to store the email content including timestamp, sender, recipients, subject, content, attachments and URLs in a database; and to scan and detect any attachments and URLs for possible threats, and to notify a human system manager of every event relating to the artificial profiles and the honeypot mailboxes; and (c) a Management graphical user interface (GUI) device comprising a graphical user interface that supports the entire process of creating, managing, and monitoring the SN honeypot profiles by allowing the human system manager to carry out activities such as activating specific crawling tasks, viewing the crawled profiles and the topology they create, zooming into profiles and viewing the events related to honeypots by exploring the emails and scanning results, characterized in that:

A) the Management GUI device also comprises software adapted to perform reoccurring scanning of previous attachments and URLs collected and stored by the Profile Monitoring device; and B) the system also comprises:

d) a SN Crawler device comprising at least one plugin, wherein each plugin comprises software adapted to extract actual user SN profiles of the target organization and/or similar organizations from a designated SN and insert said extracted actual SN profiles into a generic database of profiles;

e) a Profiles Database which comprises the actual SN profiles extracted by the at least one plugin of the SN Crawler device; and f) an Artificial Profile Generator device adapted to generate massive numbers of artificial profiles by using statistical methods on actual SN profiles stored in a Profiles Database and to connect the artificial profile with other real and artificial profiles in a social network.

* * * * *